United States Patent [19]

Gautier et al.

[11] Patent Number: 5,243,026

[45] Date of Patent: Sep. 7, 1993

[54] CONTINUOUS GAS PHASE POLYMERIZATION OF CO/OLEFIN WITH PALLADIUM AND METAL FLUORIDE LEWIS ACID CATALYST

[75] Inventors: Pieter A. Gautier; Johannes J. Keijsper; Rudolf J. Wijngaarden, all of Amsterdam, Netherlands

[73] Assignee: Shell Oil Company, Houston, Tex.

[21] Appl. No.: 944,670

[22] Filed: Sep. 14, 1992

[30] Foreign Application Priority Data

Sep. 27, 1991 [NL] Netherlands ............... 9101638

[51] Int. Cl.$^5$ .............................................. C08G 67/02
[52] U.S. Cl. ..................................... 528/392; 526/67; 526/69
[58] Field of Search ................ 528/392; 526/67, 69

[56] References Cited

U.S. PATENT DOCUMENTS

4,778,876 10/1988 Doyle et al. ............ 528/392
4,940,776 7/1990 Bakkum et al.

FOREIGN PATENT DOCUMENTS

8801276A 12/1989 Netherlands.

Primary Examiner—Harold D. Anderson
Attorney, Agent, or Firm—James O. Okorafor

[57] ABSTRACT

An improved, continuous, gas-phase process for the production of linear alternating polymers of carbon monoxide and at least one ethylenically unsaturated hydrocarbon in the presence of a supported catalyst composition, the catalyst composition being formed from a compound of palladium, a Lewis acid and a bidentate ligand of phosphorus, includes return to the polymerization reactor of relatively small particles of polyketone polymer products after catalyst composition has been supplied to the particles.

13 Claims, No Drawings

CONTINUOUS GAS PHASE POLYMERIZATION OF CO/OLEFIN WITH PALLADIUM AND METAL FLUORIDE LEWIS ACID CATALYST

Field of the Invention

This invention relates to an improved, continuous gas-phase process for the production of linear alternating polymers of carbon monoxide and at least one ethylenically unsaturated hydrocarbon.

Background of the Invention

The class of linear alternating polymers of carbon monoxide and at least one ethylenically unsaturated hydrocarbon is well known in the art. Such materials, also known as polyketones or polyketone polymers, are represented by the repeating formula

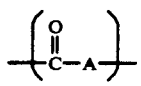

(I)

wherein A is a moiety of at least one ethylenically unsaturated hydrocarbon polymerized through the ethylenic unsaturation thereof. Although the scope of the process of producing such polymers is extensive, a particularly useful type of process comprises contacting under polymerization conditions the carbon monoxide and hydrocarbon in the presence of a catalyst composition formed from a compound of a Group VIII metal, particularly palladium, an acidic material and a bidentate ligand of phosphorus, sulfur or nitrogen, particularly phosphorus.

In one modification, the polymerization is conducted in the presence of an inert liquid diluent such as methanol or acetone. This polymerization is termed liquid phase if the catalyst composition is soluble in the diluent or slurry phase if a heterogeneous supported catalyst composition is employed. In this modification, the polymer product is obtained as a material substantially insoluble in the diluent and is recovered by separation from the diluent. In another modification, the polymerization is conducted in the gas phase in the substantial absence of liquid reaction diluent. In this modification the catalyst composition is typically provided as a supported catalyst composition. This latter modification has an advantage of not requiring a polymer separation step as the polymer is directly obtained in particulate form in the reactor.

Gas-phase polymerization is conducted in batchwise, semi-continuous or continuous manner. In batchwise operation, reactants and catalyst composition are charged to a reactor and placed under polymerization conditions. During polymerization, product is formed, reactants are consumed and the pressure decreases. In this type of operation, only the temperature remains constant and the product mixture is somewhat variable in composition. In semi-continuous operation, additional reactants are provided during polymerization to maintain constant pressure but the quantity of polymer present will change. In continuous operation, additional monomer and catalyst composition are added during polymerization and polymer product is continuously withdrawn. After an initial start-up period, a steady state is reached wherein all variables remain essentially constant. This type of operation is advantageous because of the relatively uniform product produced.

It is known, for example, from copending U.S. patent application Ser. No. 833,203, filed Feb. 10, 1992, that the gas-phase polymerization activity of the supported catalyst composition is influenced by the nature of the supported catalyst composition. In general, the smaller the average diameter of the support particles, and thus the smaller the average diameter of the supported catalyst composition particles, the more active the catalyst composition will be. In a somewhat related slurry-phase process described in copending U.S. application Ser. No. 860,525, filed Mar. 30, 1992, a fraction of the supported catalyst composition is recycled to the reactor while passing through a means of mechanically reducing the average particle size of supported catalyst composition particles. It would be of advantage, however, to obtain an improved gas-phase polymerization process which, in continuous operation, utilizes smaller supported catalyst composition particles and therefore takes advantage of the generally increased catalytic activity.

Summary of the Invention

The present invention provides an improved gas-phase process for the production of linear alternating polymers of carbon monoxide and at least one ethylenically unsaturated hydrocarbon. More particularly, the invention provides an improved continuous process for such production employing a supported catalyst composition wherein small particles of polymer product are provided with additional catalyst composition and recycled to the polymerization reactor. The particles recycled are the polymer product particles of relatively small average particle diameter or are polymer particles whose average particle diameter has been reduced by mechanical means.

Description of the Invention

The process of the invention provides an improved polymerization process of advantageous economy as compared with those processes which use entirely fresh supported catalyst composition, and provides a faster polymerization rate than those processes which recycle a randomly selected portion of the product polymer particles.

The olefinically unsaturated hydrocarbons employed as monomers in the process of the invention have up to 10 carbon atoms inclusive and preferably have up to 6 carbon atoms inclusive. Illustrative of such ethylenically unsaturated hydrocarbons are ethylene, propylene, 1-butene, isobutylene, 1-hexene, 1-deoene, styrene and 4-methylstyrene. The preferred olefinically unsaturated hydrocarbons are aliphatic unsaturated hydrocarbons and particularly preferred are ethylene and propylene. The preferred linear alternating polymers are copolymers of carbon monoxide and ethylene or terpolymers of carbon monoxide, ethylene and propylene.

The linear alternating polymers are produced by contacting the carbon monoxide and hydrocarbon monomers under polymerization conditions in the gas phase in the presence of a supported catalyst composition. The catalyst composition is formed from a compound of palladium, an acid material, and a bidentate ligand of phosphorus.

The palladium compound is preferably a palladium carboxylate and palladium acetate, palladium propionate, palladium hexanoate and palladium octanoate are satisfactory. Particularly preferred as the compound of palladium is palladium acetate. The acid component of the catalyst composition is a Lewis acid of the general formula $$MF_n \qquad (II)$$

wherein M is a trivalent or pentavalent metal which reacts with fluorine to form a binary fluoride, and n is 3 or 5 respectively. Illustrative of the Lewis acids of the above formula II are boron trifluoride, aluminum trifluoride and antimony pentafluoride. Preferred, however, are acid components formed from a mixture of hydrogen fluoride and Lewis acid of the general formula $$M'F_m \qquad (III)$$

where M is a trivalent to pentavalent inclusive metal which reacts with fluorine to form a binary fluoride, and m is a number from 3 to 5 inclusive determined by the oxidation state of M'. Lewis acids of formula III are illustrated by boron trifluoride, titanium tetrafluoride, phosphorus pentafluoride and antimony pentafluoride. The mixed hydrogen fluoride/Lewis acids have from 0.1 mol to about 10 mols of hydrogen fluoride per mol of Lewis acid but preferably from about 0.5 mol to about 5 mols of hydrogen fluoride per mol of Lewis acid. Illustrative of such "mixed" acid components are tetrafluoroboric acid, hexafluorotitanic acid, hexafluorophosphonic acid and hexafluoroantimonic acid. The quantity of acid component to be employed in the catalyst compositions of the invention is that sufficient to provide from about 0.5 mol to about 200 mols, preferably from about 1 mol to about 100 mols, of Lewis acid per mol of palladium (as the compound).

The bidentate ligand of phosphorus employed in the catalyst composition is of the general formula

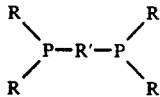

(IV)

wherein R independently is aliphatic or aromatic of up to 10 carbon atoms inclusive, and R' is a divalent hydrocarbyl bridging group of up to 10 carbon atoms inclusive with from 2 to 4 carbon atoms inclusive in the bridge. The R group is hydrocarbyl containing only atoms of carbon and hydrogen or is substituted hydrocarbyl containing additional atoms as inert carbon atom substituents. Illustrative aliphatic R groups include methyl, ethyl, propyl, hexyl, 4-methylhexyl, 2-chloroethyl and 3-bromopropyl. Hydrocarbyl aromatic groups include phenyl, tolyl, xylyl and naphthyl. The preferred R groups are substituted hydrocarbyl aromatic groups having a polar substituent on at least one carbon atom of an aromatic ring located ortho to the ring carbon atom through which the R group is bound to the phosphorus. The preferred polar substituents are alkoxy groups, particularly methoxy, and illustrative of such substituted hydrocarbyl aromatic R groups are 2-methoxyphenyl, 2-ethoxyphenyl, 2,6-dimethoxyphenyl and 2-methoxy-4-ethoxyphenyl. Particularly preferred as the R substituent is 2-methoxyphenyl. The R' linking group is suitably 1,2-ethylene, 1,3-propylene, 1,4-butylene, 1,3-butylene, 2-methyl-1,3-propylene or 2,2-dimethyl-1,3-propylene. The preferred R' group is 1,3-propylene and the preferred bidentate ligand of phosphorus is 1,3-bis[di(2-methoxyphenyl)phosphino]-propane. The quantity of bidentate phosphorus ligand is from about 0.5 mol to about 2 mols of ligand per mol of palladium. Quantities of ligand from about 0.75 mol to about 1.5 mols of ligand per mol of palladium are preferred.

It is useful on occasion to provide an organic oxidizing agent to the catalyst composition. Suitable organic oxidizing agents include aliphatic nitrite compounds such as butyl nitrite and amyl nitrite and hydroquinones, both 1,2 and 1,4-hydroquinones. Preferred, however, as the oxidizing agent is an aromatic nitro compound such as nitrobenzene or 2,4-dinitrotoluene. As stated, the presence of organic oxidizing agent is not required but amounts of oxidizing agent up to about 5000 mols per mol of palladium are satisfactory. When organic oxidizing agent is present, amounts from about 10 mols to about 1000 mols are preferred.

In the gas-phase process of the invention, the catalyst composition is employed as a supported catalyst composition on a solid support. The support is usefully inorganic such as silica, talc or alumina or is organic such as carbon, cellulose, dextrose or dextran gel. Also suitable as organic catalyst composition supports are polymers such as polyethylene, polypropylene or polystyrene. Particularly preferred as the catalyst composition support is a linear alternating polymer of carbon monoxide and at least one ethylenically unsaturated hydrocarbon of the same general type as the product of the polymerization process.

The supported catalyst compositions are produced by impregnating the catalyst support with a solution or suspension of the catalyst composition components in a liquid diluent in which the components are at least partially soluble and subsequently removing the liquid. The catalyst composition components are suitably mixed and then used as a mixture to impregnate the support. Alternatively, the catalyst composition components are provided to the support individually. However provided, sufficient catalyst composition is utilized to have from about 10 mg to about 100,000 mg of palladium per kg of carrier. Preferred amounts of catalyst composition provide from about 50 mg to about 10,000 mg of palladium per kg of support.

The gas-phase polymerization process of the invention comprises contacting the carbon monoxide and hydrocarbon reactants in a polymerization reactor under polymerization conditions in the gas phase in the substantial absence of reaction diluent in the presence of the supported catalyst composition. The molar ratio of carbon monoxide to total ethylenically unsaturated hydrocarbon is suitably from about 10:1 to about 1:10. Preferred molar ratios are from about 5:1 to about 1:5. The polymerization conditions include a polymerization temperature from about 25° C. to about 150° C. with polymerization temperatures from about 30° C. to about 130° C. being preferred. The polymerization pressure is from about 2 bar to about 150 bar with pressures from about 5 bar to about 100 bar being more frequently encountered. Sufficient supported catalyst composition is utilized to provide from about $1 \times 10^{-7}$ mol of palladium to about $1 \times 10^{-3}$ mol of palladium per mol of total ethylenically unsaturated hydrocarbon. Preferred quantities of supported catalyst composition provide from about $1 \times 10^{-6}$ mol to about $1 \times 10^{-4}$ mol of palladium per mol of total ethylenically unsaturated hydrocarbon.

The polymer product is typically obtained as a solid, particulate material wherein the polyketone polymer product has surrounded the supported catalyst composition particles. Depending in part upon the nature of the support utilized, a variety of polymer products with a wide range of properties is obtained. Particularly in the preferred modification where the support is a linear alternating polymer of the general type being produced, the polyketone polymer product is useful as produced. Alternatively, however, the polyketone polymer product is purified as by contact with a solvent or complexing agent selective for catalyst composition residue or catalyst composition carrier.

In the process of the invention, relatively small particles of polyketone polymer product are supplied with additional catalyst composition and recycled to the polymerization reactor. The recycled particles suitably have an average particle diameter between about 1μ and about 2000μ. Preferred average particle diameter for particles to be recycled to the reactor is from about 10μ to about 1000μ.

In one modification, the particles of relatively small average particle diameter are obtained by physical separation of the product mixture as by sieving, fluidization, pneumatic segregation or by the use of cyclones. The relatively small particles of the above average particle diameter are physically separated, supplied with catalyst composition as described above and then returned to the reactor. In an alternate modification, the relatively small particles are obtained by mechanical size reduction of the polymer product particles. Size reduction is achieved, for example, by grinding or crushing. In this modification, a portion of the product polyketone polymer particles are removed from the total polymer product, mechanically reduced in size to the desired average particle diameter, supplied with fresh catalyst composition as described above and returned to the reactor. By either modification, the proportion of the total polymer product to be supplied with fresh catalyst composition and recycled is from about 0.1% by weight to about 10% by weight of the total polyketone polymer product.

The process of the invention offers substantial economic advantages over similar processes. Since the process is continuous, polyketone polymer product of relatively high uniformity is obtained and is obtained without the need for a solid/liquid separation as required by liquid-phase or slurry-phase processes. At least after the initial start-up period, the supported catalyst composition particles are relatively small in average particle diameter and the polymerization rate is relatively high. The use of recycled polymer as the carrier for the supported catalyst composition provides economic savings over a continued use of fresh carrier.

The polyketone polymer product of the process of the invention is a thermoplastic polymer of established utility. The polymer is processed by methods conventional for thermoplastic polymers, e.g., extrusion, thermoforming and injection molding, into a variety of shaped articles. Illustrative applications include the production of containers for food and drink and the production of parts and housings for automotive applications.

The invention is further illustrated by the following Comparative Examples (not of the invention) and the following Illustrative Embodiment which should not be regarded as limiting. All copolymers produced were examined by NMR and found to be linear with units derived from carbon monoxide alternating with units derived from ethylene.

Comparative Example I

A copolymer of carbon monoxide and ethylene was produced with a supported catalyst composition formed by adsorbing a catalyst composition solution comprising 1.5 ml methanol, 0.5 ml tetrahydrofuran, 0.0095 mmol palladium acetate, 0.024 mmol tetrafluoroboric acid and 0.0104 mmol 1,3-bis[di(2-methoxyphenyl)-phosphino]propane on 8 g of a linear alternating copolymer of carbon monoxide and ethylene having an average particle diameter of 275μ. The catalyst composition thereby prepared, having a palladium content of 126 ppmw was introduced into an autoclave of 300 ml capacity equipped with a mechanical stirrer. After the air in the autoclave had been displaced with nitrogen, the autoclave and contents were warmed to 85° C. and an equimolar mixture of carbon monoxide and ethylene was added until a pressure of 50 bar was reached. Hydrogen was then added until a total pressure of 55 bar was obtained. During the resulting polymerization, additional equimolar mixture was added to maintain a pressure of 55 bar. After 18 hours, the polymerization was terminated by cooling the autoclave and contents to room temperature and releasing the pressure. The yield of copolymer was 112 and the copolymer particles had an average diameter of 500μ and a palladium content of 9 ppmw. The average polymerization rate over the first 4 hours was calculated to be 9.8 kg of copolymer/g Pd hr. The average polymerization over the entire 18-hour period was 5.7 kg of copolymer/g Pd hr.

Comparative Example II

A copolymer of carbon monoxide and ethylene was produced by a procedure substantially similar to that of Comparative Example I except that the carrier particles had an average diameter of 1300μ. The yield of copolymer was 21 g with an average particle diameter of 1400μ and a palladium content of 49 ppmw. The average polymerization rate over the first 4 hours was 1.3 kg of copolymer/g Pd hr and the average rate over the entire 18-hour period was 0.7 g of copolymer/g Pd hr.

Comparative Example III

A carbon monoxide/ethylene copolymer was produced by a procedure substantially similar to that of Comparative Example I except that, as carrier, the polymer produced in Comparative Example I of 500μ average particle diameter was used. The yield of copolymer was 26 g and the product had an average particle diameter of 750μ and a palladium content of 39 ppmw. The average polymerization rate over the first 4 hours was 2.0 kg of copolymer/g Pd hr and the average polymerization rate over the 18-hour period was 1.0 kg of copolymer/g Pd hr.

Comparative Example IV

A copolymer of carbon monoxide and ethylene was produced by a procedure substantially similar to that of Comparative Example I except that the carrier particles were the particles of 500μ average particle diameter produced in Comparative Example I which had been reduced in size to 200μ and the reaction time was 30 hours instead of 18 hours. The yield of copolymer was 98 g and the copolymer had an average particle diameter of 400μ and a palladium content of 9 ppmw. The average polymerization rate over the first 4 hours was 3.5 kg of copolymer/g Pd hr and the average polymerization rate over the 30-hour period was 3.0 kg of copolymer/g Pd hr.

Comparative Example V

The results of Comparative Example I were extended by calculation to reflect a commercial scale production of the carbon monoxide/ethylene copolymer of 100,000 metric tons/year. It is calculated that if the same rate of production were obtained, 7000 tons of fresh supported catalyst composition are required to produce this quantity of polymer.

Illustrative Embodiment

From the results of Comparative Examples I and IV, the amount of catalyst required to produce 100,000 metric tons of carbon monoxide/ethylene copolymer in a continuous process according to the invention can be calculated. The polymerization is initiated by a continuous supply of monomers to a reactor containing 200 tons of the catalyst composition prepared according to Comparative Example I. During the start-up period, the quantity of polymer in the reactor increases as does the average particle size. After the quantity of polymer in the reactor reaches about 400 tons, about 12.5 tons of copolymer product per hour is discharged and additional monomers are supplied continuously. Of the polymer product discharged, about 1 ton per hour is separated, ground, loaded with additional catalyst composition and returned to the reactor. Through the use of this procedure, only 200 tons of fresh carrier are required.

What is claimed is:

1. A continuous, gas-phase process for the production of linear alternating polymer of carbon monoxide and at least one ethylenically unsaturated hydrocarbon by
   a) contacting in a polymerization reactor the carbon monoxide and hydrocarbon under polymerization conditions in the substantial absence of liquid diluent and in the presence of a supported catalyst composition, wherein the catalyst composition is formed from a compound of palladium, a metal fluoride Lewis acid and a bidentate ligand of phosphorus; and
   b) supplying catalyst composition to and subsequently returning to the reactor recovered polymer product particles of relatively small average particle diameter.

2. The process of claim 1 wherein the compound of palladium is palladium acetate.

3. The process of claim 2 wherein the Lewis acid is (i) a compound of the formula $MF_n$ wherein M is a trivalent or pentavalent metal which reacts with flourine to form a binary flouride and n is 2 or 5 respective, or (ii) a compound of the formula $M'F_m$, wherein M' is a trivalent to pentavalent inclusive metal which reacts with fluoride to form a binary fluoride and m is 3 to 5 inclusive as determined by the oxidation state of M', and from about 0.1 mol to about 10 mols per mol of the Lewis acid of hydrogen fluoride.

4. The process of claim 3 wherein the bidentate ligand of phosphorus is of the formula

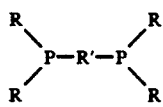

wherein R independently is aliphatic or aromatic of up to 10 carbon atoms inclusive, and R' is a divalent hydrocarbyl bridging group of up to 10 carbon atoms inclusive with from 2 to 4 carbon atoms inclusive in the bridge.

5. The process of claim 1 wherein R' is 1,3-propylene.

6. The process of claim 5 wherein R' is substituted hydrocarbyl aromatic having a polar substituent located on a ring carbon atom located ortho to the ring carbon atom through which the group is attached to phosphorus.

7. The process of claim 6 wherein the product particles returned to the reactor are of average particle size from about $1\mu$ to about $2000\mu$.

8. The process of claim 7 wherein the product particles returned to the reactor are obtained by physical separation of the product particles.

9. The process of claim 7 wherein the product particles returned to the reactor are obtained by mechanically reducing the size of product particles.

10. The process of claim 7 wherein the catalyst composition is formed from palladium acetate, a Lewis acid selected from boron trifluoride, aluminum trifluoride, antimony pentafluoride, tetrafluoroboric acid, hexafluorotitanic acid, hexafluorophosphonic acid or hexaflurooantimonic acid, and 1,3-bis[di(2-methoxyphenyl)phosphinol]propane.

11. The process of claim 7 wherein from about 0.1% by weight to about 10% by weight of the total polymer product particles are returned to the reactor.

12. The process of claim 11 wherein the product particles returned to the reactor are obtained by physical separation of the product particles.

13. The process of claim 11 wherein the product particles returned to the reactor are obtained by mechanically reducing the size of product particles.

* * * * *